(12) United States Patent
Herrmann et al.

(10) Patent No.: US 6,384,148 B1
(45) Date of Patent: May 7, 2002

(54) POLYMER OXIDATES AND THEIR USE

(75) Inventors: Hans-Friedrich Herrmann, Gross-Gerau; Gerd Hohner, Gersthofen, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/469,061

(22) Filed: Dec. 21, 1999

(30) Foreign Application Priority Data

Dec. 24, 1998 (DE) .......................................... 198 60 174

(51) Int. Cl.$^7$ .................................................. C08F 8/06
(52) U.S. Cl. ...................... 525/333.8; 525/388; 524/585
(58) Field of Search ............................... 525/388, 333.8

(56) References Cited

U.S. PATENT DOCUMENTS

| | | |
|---|---|---|
| 3,285,902 A | 11/1966 | Schmeidl et al. |
| 3,383,338 A | 5/1968 | Wells et al. |
| 3,756,999 A | 9/1973 | Stetter et al. |
| 4,132,691 A | 1/1979 | Ejk |
| 4,378,998 A | 4/1983 | Korbanka et al. |
| 4,661,163 A | 4/1987 | Berke et al. |
| 5,578,537 A | 11/1996 | Herrmann et al. |
| 5,723,705 A | 3/1998 | Herrmann et al. |
| 5,750,813 A | 5/1998 | Hess et al. |

FOREIGN PATENT DOCUMENTS

| | | |
|---|---|---|
| DE | 1 227 654 | 10/1966 |
| DE | 1 520 008 | 11/1969 |
| DE | 2 035 706 | 1/1972 |
| DE | 32 38 652 | 5/1983 |
| DE | 196 17 230 | 11/1997 |
| EP | 0 028 384 | 5/1981 |
| EP | 0 323 716 | 7/1989 |
| EP | 0 361 866 | 4/1990 |
| EP | 0 498 417 | 8/1992 |
| EP | 0 571 882 | 12/1993 |
| EP | 0 578 838 | 1/1994 |
| EP | 0 602 509 | 6/1994 |

OTHER PUBLICATIONS

Ullman's Encyclopedia of Industrial Chemistry, 5$^{th}$, A28, 1996, pp155–156.
Derwent Patent Family Abstract for EP 0 498 417, Aug. 12, 1992.
Derwent Patent Family Abstract for DE 196 17 230, Nov. 6, 1997.

*Primary Examiner*—Bernard Lipman
(74) *Attorney, Agent, or Firm*—Anthony A. Bisulca

(57) ABSTRACT

The present invention relates to polymer oxidates prepared by reacting polyethylene which has been obtained using metallocene catalysts and which has a weight-average molar mass above 40,000 g/mol with oxygen or oxygen-containing gas mixtures.

These polymer oxidates have high suitability for preparing aqueous dispersions, as a material added when dispersing pigments in masterbatches, or for surface-modification or for polar modification of polyolefins. Another advantageous application sector is use as an additive, e.g. as a lubricant for plastics processing.

8 Claims, No Drawings

POLYMER OXIDATES AND THEIR USE

FIELD OF THE INVENTION

The invention relates to polymer oxidates with improved dispersability in aqueous media, their preparation by oxidative degradation of polyethylene plastic, and their use.

DESCRIPTION OF THE RELATED ART

Ethylene homo- and copolymers which have the nature of plastics may be reacted to give polar products via controlled oxidative degradation. Polymer oxidates of this type have oxygen-containing functional groups, e.g. carboxyl, ester and ketone groups, and, due to the polarity which these give, are suitable for preparing aqueous dispersions for applications in polishes or the industrial sector for example. Polyethylene oxidates also serve as auxiliaries for processing and shaping plastics (cf. Ullmann's Encyclopaedia of Industrial Chemistry, 5th Edn, Vol. A28, pp.155–156, Weinheim 1996).

Processes for the oxidative degradation of polyethylene plastic are known. For example, this may be done by treating the finely divided raw material at below its softening point with oxygen or with oxygen-containing gases (DE-A-1 520 008). A variant of this procedure is to carry out the reaction in the presence of an inert dispersion medium, e.g. water (DE-A-3 238 652). The oxidative degradation of ethylene homo- and copolymers at temperatures above the softening point in the presence of an inert dispersion medium has also been described (DE-A-2 035 706, EP-A-28 384). The polyethylene used for the oxidation is prepared by ethylene polymerization with the aid of titanium and/or chromium transition metal catalysts by the low-pressure process or by the free-radical high-pressure process. It is also known that low-molar-mass polyethylene waxes can be oxidized to give wax oxidates. These are obtained by bringing oxygen-containing gases into contact with the melts of the raw materials. The starting material here has low viscosity and it is therefore unnecessary to add a dispersion medium. The oxidation of polyethylene waxes whose weight-average molar Mass is below 40,000 g/mol, generally below 10,000 g/mol, gives products whose type differs from those obtained from high-molar-mass polyethylene which has the nature of plastic. Wax oxidates have relatively low molar mass and are softer than polymer oxidates, and if used in floor covering polish formulations, for example, they are inferior to polymer oxidates in terms of hardness and resistance to foot traffic. Wax oxidates are disclosed, for example, in DE-A-1 227 654.

Aqueous dispersions prepared using the abovementioned polymer oxidates frequently have disadvantages in practical use, for example insufficient transparency, excessive viscosity, reduced gloss after film application or unsatisfactory storage stability.

The object was therefore to provide polymer oxidates with improved dispersion and usage properties and not having the disadvantages of previously known polymer oxidates.

Surprisingly, it has now been found that polymer oxidates with improved properties are obtained if the high-molar-mass polymer used as starting material has been prepared with the aid of metallocene catalysts.

DESCRIPTION OF THE PREFERRED EMBODIMENTS

The invention therefore provides polymer oxidates wherein a starting polymer, which is a polyethylene obtained using metallocene catalysts and having a weight-average molar mass above 40,000 g/mol, is oxidized by reaction with oxygen or oxygen-containing gas mixtures.

Starting Polymer

Polymerization processes for preparing polyethylene with the aid of metallocene catalyst systems are known. A suspension process is described in EP-A-578 838, there are details for the gas-phase process in EP-A-323 716, for example, and the high-pressure process in EP-A-361 866, for example.

Suitable starting polymers are polyethylenes prepared using metallocene catalysts, and for the purposes of the present invention these are ethylene homo-, co- or terpolymers with weight-average molar masses Mw above 40,000 g/mol, preferably from 50,000 to 4,000,000 g/mol. The melt viscosities of polymers of this type, measured at 140° C., are above 50,000 mPa.s, usually above 100 Pa.s. The melt flow rate MFR 190/5, which is the variable usually used for polymer viscosities, is below 100 g/10 min, usually less than or equal to 50 g/10 min.

Besides ethylene, this starting polymer may also comprise amounts of from 0.1 to 20% by weight, based on total polymer, of (α-olefins with chain lengths from 3 to 30, preferably from 3 to 8, e.g. propene, 1-butene, 1-hexene or 1-octene. Particular preference is given to ethylene copolymers with up to 10% by weight of propene or 1-butene.

Preferred starting polymers have narrow molar mass distribution $M_w/M_n$ of below 5, preferably below 4, in particular less than or equal to 3.5.

Preparation of the Starting Polymer

Catalyst systems for preparing the starting polymer are composed of one or more metallocene compounds (I) together with a cocatalyst (II), and also, if desired, another catalyst component (III) and a scavenger (IV). The catalyst system is frequently used after fixing on a support, in which case the species active for polymerization is produced either prior to, during or after application to the support, depending on variations in the order in which components (I) to (IV) and the support are used.

The metallocene compound (I) typically has the formula I

and includes, for example, structures of the formulae (Ia):

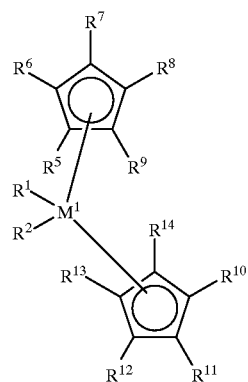

(Ia)

of the formula Ib:

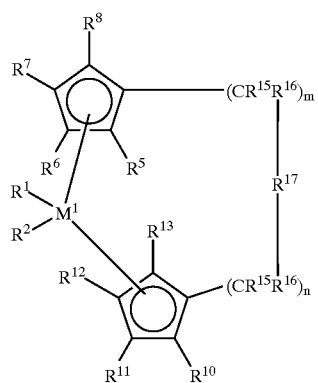

(Ib)

or of the formula Ic:

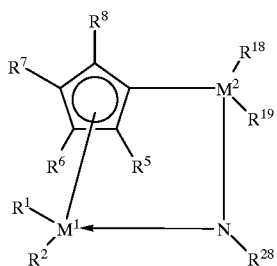

(Ic)

$M^1$ in the formulae is a metal of group IVb, Vb, VIb or VIIIb of the Periodic Table, for example titanium, zirconium, iron, chromium, cobalt or nickel.

$R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom.

$R^3$ and $R^4$ are identical or different and in the embodiments of the formulae (Ia) to (Ic) are alkyl, pyridyl, arylalkyl, alkylaryl, or mono- or bisalkylpyridyl-substituted imido radicals, which may have bridging to one another via alkyl, bisalkylaryl or bisalkylpyridyl groups. One of the radicals $R^3$ and $R^4$ may moreover be a substituted nitrogen atom, in which case $R^{28}$ is defined as for $R^{21}$ and is preferably methyl, tert-butyl or cyclohexyl.

$R^5$ to $R^{14}$ are identical or different and, independently of one another, are a hydrogen atom, a halogen atom, a $C_1$–$C_{18}$-aryl group, a $C_1$–$C_{10}$-alkoxy group, or an —$NR^{20}_2$—, —$SR^{20}$—, —$OSiR^{20}_3$—, —$SiR^{20}_3$—, or —$PR^{20}_2$— radical, where $R^{20}$ is a $C_1$–$C_{10}$-alkyl group or a $C_6$–$C_{10}$-aryl group, or, in the case of radicals containing Si or P, also a halogen atom, or two adjacent radicals $R^5$, $R^6$, $R^7$, $R^8$, $R^9$, $R^{10}$, $R^{11}$, $R^{12}$, $R^{13}$ or $R^{14}$, together with the carbon atoms connecting them, may form a ring system. This gives, for example, 2-methyl-4-naphthylindenyl or substituted benzoindenyl or fluorenyl. Preferred substituents for these ligands have been given in the description of $R^1$.

$R^{17}$ is:

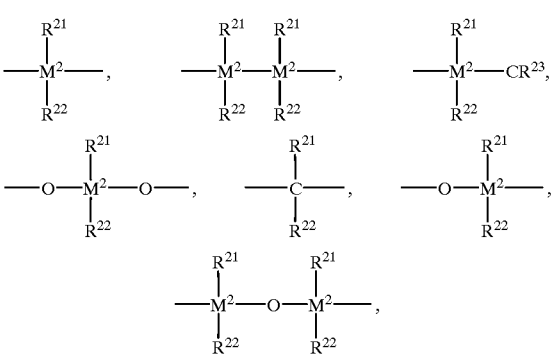

=$BR^{21}$, =$AlR^{21}$, —Ge—, —Sn—, —O—, —S—, =SO, =$SO_2$, =$NR^{19}$, =CO, =$PR^{19}$ or =$P(O)R^{19}$, where $R^{21}$, $R^{22}$ and $R^{23}$ are identical or different and are a hydrogen atom, a halogen atom, a $C_1$–$C_{30}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{21}$ and $R^{22}$ or $R^{21}$ and $R^{23}$, in each case together with the atoms connecting them, may form a ring having from 2 to 8 ring-carbon atoms.

$M^2$ is silicon, germanium or tin, preferably silicon. $R^{17}$ is preferably =$CR^{21}R^{22}$, =$SiR^{21}R^{22}$, =$GeR^{21}R^{22}$, —O—, —S—, =SO, =$PR^{21}$ or =$P(O)R^{21}$.

$R^{15}$ and $R^{16}$ are identical or different and are as defined for $R^{21}$.

m and n are identical or different and are 0, 1 or 2.

$R^{18}$ and $R^{19}$ are as defined for $R^{21}$ and $R^{22}$.

Illustrative examples of metallocenes are:

bis(1-n-butyl-3-methyl-cyclopentadienyl)zirconium dichloride,
bistetrahydroindenyl(dimethyl)zirconium,
dimethylsilyl-bis-1-(2-methyl-4,5-benzoindenyl)(dibenzyl) zirconium,
dimethylsilyl-bis-1-(2-methyltetrahydroindenyl)zirconium dichloride,
ethylenebis-1-(2-methyl-4-phenylindenyl)zirconium dichloride,
ethylenebis-1-(tetrahydroindenyl)zirconium dichloride,
isopropylidene(1-indenyl)(cyclopentadienyl)zirconium dichloride, isopropylidene(9-fluorenyl)(cyclopentadienyl)zirconium dichloride,
(tert-butylamido)dimethyl(tetramethylcyclopentadienyl) silyl(dimethyl)-titanium,
2,6-bis[1-(2-tert-butylphenylimino)ethyl]pyridineiron dichloride, and
2,6-bis[(2,6-di-isopropylphenylimino)methyl] pyridinecobalt dichloride.

Suitable cocatalysts (II) are organoaluminum compounds, in particular aluminoxanes, or else aluminium-free systems, such as $R^{26}_xNH_{4-x}BR^{27}_4$, $R^{26}_xPH_{4-x}BR^{27}_4$, $R^{26}_3CBR^{27}_4$ or $BR^{27}_3$. In these formulae x is a number from 1 to 4, and the radicals $R^{26}$ are identical or different and are $C_1$–$C_{20}$-alkyl or $C_6$–$C_{12}$-aryl, or two radicals $R^{26}$, together with the atom connecting them, may form a ring having from 2 to 8 ring-carbon atoms. The radicals $R^{27}$ are identical or different and are aryl, which may have alkyl-, haloalky- or halo-substitution. Examples of $R^{26}$ are ethyl and phenyl, and an example of $R^{27}$ is pentafluorophenyl. Aluminoxanes, prepared by controlled hydrolysis of tialkylaluminum compounds, or mixtures of these, in particular methylaluminoxane, are generally successful for activation.

Component (III) is a cyclic boroxine of the formula $(R^{21}BO)_3$, such as trimethylboroxine, where the radicals $R^{21}$ may also differ from one another. Other compounds of type (II) may also be used instead of this to increase the activity of the catalyst system.

In addition, use may be made of the scavenger (IV) to maintain protection of the polymerization system from polar catalyst poisons. Any organoaluminum compound, such as triethylaluminum or triisobutylaluminum, or also mixtures of these, is suitable for this purpose.

Oxidation of the Starting Polymer

The oxidation is carried out in such a way as to give the polymer oxidates obtained acid numbers of from 0.5 to 200 mg KOH/g and melt viscosities at 140° C. of from 50 to 20,000 mPa.s, preferably from 100 to 20,000 mPa.s.

The oxidative degradation of the high-molar-mass starting polymer is carried out by exposure to oxygen or oxygen-containing gases, preferably air, at at least atmospheric pressure. The temperature used here may be below or above the softening point of the polymer. In the latter case the presence of an inert dispersion medium, such as water, is generally necessary to ensure that the phase boundary area between the polymer melt and the oxidizing agent is sufficiently large to give rapid reaction. If the oxidation is carried out at below the softening point, the reaction proceeds at a lower rate, but the addition and subsequent removal of dispersion medium can then be dispensed with. The progress of the reaction can be followed using the acid number. Small amounts of previously oxidized polyethylene can be added as a "starting aid" for the reaction.

The oxidative degradation to give polymer oxidates may be additionally promoted by pretreatment of the polymer with peroxide or azo compounds, such as 2,2'-azobis(2-methylpropiononitrile) or by oxidative plasma treatment. When selecting the raw materials preference should be given to unstabilized polymers or those with a low proportion of antioxidants.

Controlled addition of acids, bases or buffer substances can shorten the reaction time and prevent crosslinking reactions. The polymer oxidation may be carried out continuously or batchwise.

Use of the Polymer Oxidates

The present invention further provides the use of the novel polymer oxidate for preparing aqueous dispersions, as a material added when dispersing pigments, e.g. in masterbatches, or for surface-modification or polar modification of polyolefins. Another advantageous application sector is use as a lubricant for plastics processing.

The polymer oxidates may be processed to give aqueous dispersions using auxiliaries, such as ionic or nonionic emulsifiers, bases, such as alkali metal hydroxides or ammonia or amines, and other additives. Among the quality criteria for dispersions of this type are viscosity, storage stability at elevated temperatures, transparency, and also the gloss of the films which form when the dispersions are applied to smooth surfaces.

The functional groups in the polymer oxidate may also be derivatized by reactions at the carboxyl, ester and keto groups. This gives additives advantageously used for surface-modification or pigment dispersion, or compatibilizers for polymer blends.

EXAMPLES

The invention is described in more detail using the working examples below:

Melt flow rate is determined in accordance with ISO 1133 using Göttfert equipment. Weight-average molar mass $M_w$, number-average molar mass $M_n$ and their quotient $M_w/M_n$ are determined using gel permeation chromatography at 135° C. in 1,2-dichlorobenzene. Melt viscosities were determined in accordance with DIN 51562 using a rotary viscometer, drop points in accordance with DIN 51801/2, acid numbers in accordance with DIN 53402 and densities in accordance with DIN 53479 at 20° C. The viscosities of the aqueous dispersions were determined using a flow cup in accordance with DIN 53211. Gloss measurements of films were carried out using Micro-TRI-gloss equipment from Byk Gardner GmbH.

Synperonic 91/4® and Synperonic 91/5® are emulsifiers from ICI, and Genapol UD 080® is an emulsifier from Clariant GmbH.

Preparation and Characterization of the High-molar-mass Starting Polymers

In principle any ethylenehomo- or copolymer prepared using metallocene catalysts is suitable. The technique of carrying out the polymerization is not significant. The following raw materials were used for preparing the polymer oxidates:

TABLE 1a

Metallocene polyethylenes

| Raw material | Metallocene | $M_w$ | $M_w/M_n$ | MFR190/5 | Density | Comonomer |
|---|---|---|---|---|---|---|
| No. 1 | Bis(n-butyl-3-methyl-cyclo-pentadienyl)-zirconium dichloride | 54,000 | 2.8 | 19 | 0.958 | — |
| No. 2 | Dimethylsilylbis(tetra hydro-indenyl)-zirconium dichloride | 71,000 | 3.4 | 12 | 0.949 | Propene |
| | | g/mol | | g/10 min | G/cm³ | |

TABLE 1b

Ziegler polyethylenes (for comparative examples):

| Raw material | Metallocene | $M_w$ | $M_w/M_n$ | MFR190/5 | Density | Comonomer |
|---|---|---|---|---|---|---|
| No. 3 | Hostalen GA 7260 | 56,000 | 4.7 | 53 | 0.957 | — |
| No. 4 | Hostalen GB 7250 | 68,100 | 5.2 | 24 | 0.950 | Propene |
| | | g/mol | | g/10 min | g/cm³ | |

Preparation of the Polymer Oxidates

Examples 1 to 3; Comparative Examples 1 to 3

5.0 kg of the starting polymers listed in Tables 1a/b, 20 l of water and 300 g of an oxidized polyethylene with an acid number of 60 mg KOH/g were heated in a pressure vessel. Once an internal temperature of 140° C. had been reached, 2000 l/h of preheated air were metered into the mixture with stirring and at a constant pressure of 15 bar. The degree of oxidation achieved was followed by sampling. Once the desired acid number had been achieved air feed was terminated and the stirrer was stopped. After phase separation, the dispersion water was removed via the bottom valve, and the wax melt remaining in the reactor was dried by distilling off the residual water. The melt was discharged into trays. The following properties of the products were determined:

TABLE 2

Polymer oxidate properties

| Example | Raw material (from Table 1a/b) | Acid no. mg KOH/g | Melt visc./ 140° C. [mPa.s] | Drop point [° C.] |
|---|---|---|---|---|
| 1 | No. 1 | 16 | 2380 | 124 |
| 2 | No. 1 | 23 | 810 | 122 |
| 3 | No. 2 | 17 | 3800 | 125 |
| Comp. Example 1 | No. 3 | 17 | 1820 | 123 |
| Comp. Example 2 | No. 3 | 27 | 835 | 120 |
| Comp. Example 3 | No. 4 | 16 | 2450 | 122 |

Preparation of Aqueous Dispersions

Examples 4 and 5; Comparative Examples 4 and 5

A mixture of 280 g of polymer oxidate, 644 g of deionized water, 45.0 g of Synperonic 91/4, 20.0 g of Synperonic 91/5, 7.0 g of diethylaminoethanol, 2.0 g of potassium hydroxide (86% strength) and 2.0 g of sodium sulfite was heated in a 1 l pressure vessel equipped with stirrer, thermometer and jacket heating. Once an internal temperature of 90° C. had been achieved, the stirrer was switched on (150 rpm). Heating continued to 143°, and this temperature was maintained with further stirring for 20 min, followed by cooling of the reactor contents to about 30° C. within a period of 40 min. The resultant dispersion (35% solids content, had the properties listed in Table 3. It can be seen that the dispersions prepared from metallocene polyethylene are superior in terms of transparency and viscosity and, respectively, storage stability.

TABLE 3

| Example | Polymer oxidate | Transparency of dispersion (0.1%, 1 cm cell) % | Gloss of applied film/% (measurement angle 20/60°) % | Viscosity of dispersion (discharge time from 4 mm DIN cup) sec | | Consistency of dispersion after 1 week's storage at 50° C. |
|---|---|---|---|---|---|---|
| | | | | undiluted (35% solids content) | diluted to 30% solids content | |
| 4 | Example 1 | 63 | 82/90 | 56 | 17 | liquid |
| 5 | Example 3 | 65 | 83/91 | 38 | 13 | liquid |
| Comp. Example 4 | Comp. Example 1 | 55 | 80/89 | 210 | 23 | no longer pourable |
| Comp. Example 5 | Comp. Example 3 | 53 | 79/90 | 190 | 22 | no longer pourable |

Example 6 and Comparative Example 6

A mixture of 276 g of polymer oxidate, 644 g of deionized water, 69 g of Genapol UD 080, 7.0 g of diethylaminoethanol, 2.0 g of potassium hydroxide (86% strength) and 2.0 g of sodium sulfite was heated in a 1 l pressure vessel. Once an internal temperature of 90° C. had been achieved, the stirrer was switched on (150 rpm). Heating continued to 143°, and this temperature was maintained with further stirring for 20 min, followed by cooling of the reactor contents to about 30° C. within a period of 40 min. The resultant dispersion had the properties listed in Table 4.

TABLE 4

| Example | Polymer oxidate | Transparency of dispersion (0.1%, 1 cm cell) % | Gloss of film applied (measurement angle 20/60°) % | Viscosity of dispersion (discharge time from 4 mm DIN cup) sec |
|---|---|---|---|---|
| 6 | Example 2 | 63 | 80/89 | 23 |
| Comp. Example 6 | Comp. Example 2 | 48 | 78/80 | 30 |

What is claimed is:

1. A polymer oxidate, wherein a starting polymer, which is a polyethylene obtained using metallocene catalysts and having a weight-average molar mass above 40,000 g/mol, is oxidized by reaction with oxygen or oxygen-containing gas mixtures.

2. A polymer oxidate as claimed in claim 1, prepared from an ethylene homo-, co- or terpolymer with from 0.1 to 20% by weight of $C_3$–$C_8$ α-olefins.

3. A polymer oxidate as claimed in claim 1, wherein the starting polymer comprises up to 10% by weight of propene or 1-butene.

4. A polymer oxidate as claimed in claim 1 with an acid number of from 0.5 to 200 mg KOH/g and a melt viscosity at 140° C. of from 50 to 20,000 mPa.s.

5. A process for preparing polymer oxidates as claimed in claim 1, which comprises using air to oxidize the starting polymer.

6. A method for preparing an aqueous dispersion comprising the steps of adding the polymer oxidate of claim 1 to at least one auxiliary.

7. An aqueous dispersion comprising the polymer oxidate of claim 1.

8. A lubricant for plastics processing comprising the polymer oxidate of claim 1.

* * * * *